Jan. 7, 1964 V. E. PORTER 3,117,236

MAGNETIC FLIP-FLOP CIRCUIT

Filed Sept. 29, 1960

INVENTOR.
VIRGLE E. PORTER

BY [signature]

ATTORNEY

United States Patent Office 3,117,236

Patented Jan. 7, 1964

3,117,236

MAGNETIC FLIP-FLOP CIRCUIT

Virgle E. Porter, Country Club Hills, Ill., assignor to International Telephone and Telegraph Corporation, New York, N.Y., a corporation of Maryland Filed Sept. 29, 1960, Ser. No. 59,233

12 Claims. (Cl. 307—88)

This invention relates to magnetic logic circuits and more particularly to magnetic flip-flop circuits.

Briefly, logic circuits are used to provide an almost unlimited variety of electrical circuit functions. However, most known logic circuits include electronic discharge devices such as tubes and transistors, which are not suitable for use in hostile environments. For example, tubes require an excessive amount of source power while transistor characteristics drift with ambient temperature fluctuations. Recently developed logic circuitry uses only saturable reactors and diodes which function well in hostile environments; however, it has been difficult to perform some of the more complex logic functions with only these two types of components.

One of the more complex logic functions requires a flip-flop circuit which is successively switched between two stable states responsive to the receipt of recurring trigger signals, binary counters, for example. Sometimes these circuits fail because a race develops and the circuit is switched to an incorrect stable state, thus causing a failure of the logic function. At other times, these circuits fail because they go into self-sustained oscillations. Moreover, since the saturable reactor relies upon the rectangular hysteresis loop characteristics of its core material, it has been previously necessary to form pulses having a carefully regulated pulse width so that the saturable reactor is energized long enough to saturate or reset and so that trigger and control signals coincide.

Accordingly, it is an object of this invention to provide new and improved magnetic logic circuits and more particularly to provide magnetic flip-flop circuits incorporating a steering circuit for directing successive ones of recurring trigger pulses to switch the flip-flop to the correct stable state. In this respect, it is an object to provide magnetic flip-flop circuits which cannot go into self-sustained oscillation.

Another object of this invention is to provide magnetic logic circuits which do not require precisely formed input pulses.

Still another object of this invention is to provide magnetic logic circuits for use in hostile environments and to provide logic circuits which require a minimum of source power. More specifically, it is an object to provide magnetic logic circuits which include no tubes, transistors, or similar devices which are subject to failure under adverse operating conditions.

In accordance with one aspect of this invention, a pair of gate circuits and an inverter circuit are interconnected to provide a magnetic flip-flop circuit. The inverter includes a pair of saturable reactors interconnected so that saturation of one reactor automatically prevents saturation of the other reactor and vice versa. Current flowing through a gate winding on a saturated inverter reactor provides a first output signal and a feedback signal which prepares a gate circuit. Responsive to the occurrence of an input or trigger pulse, a reactor in the prepared gate circuit is driven into saturation, thus causing a current flow through its gate winding which reverses the saturated states of the inverter reactors. Thereupon, the current flowing in the gate winding of the reactor which is now saturated provides a second output signal and a feedback signal that prepares the other gate circuit. When either gate circuit is energized, an output current flows to inhibit or lockout the other gate circuit, thus preventing a failure of the logic functions.

The above mentioned and other features and objects of this invention and the manner of obtaining them will become more apparent and the invention itself will be best understood, by reference to the following description of an embodiment of the invention taken in conjunction with the accompanying drawings, wherein.

Figures 1, 2, 3, 4:
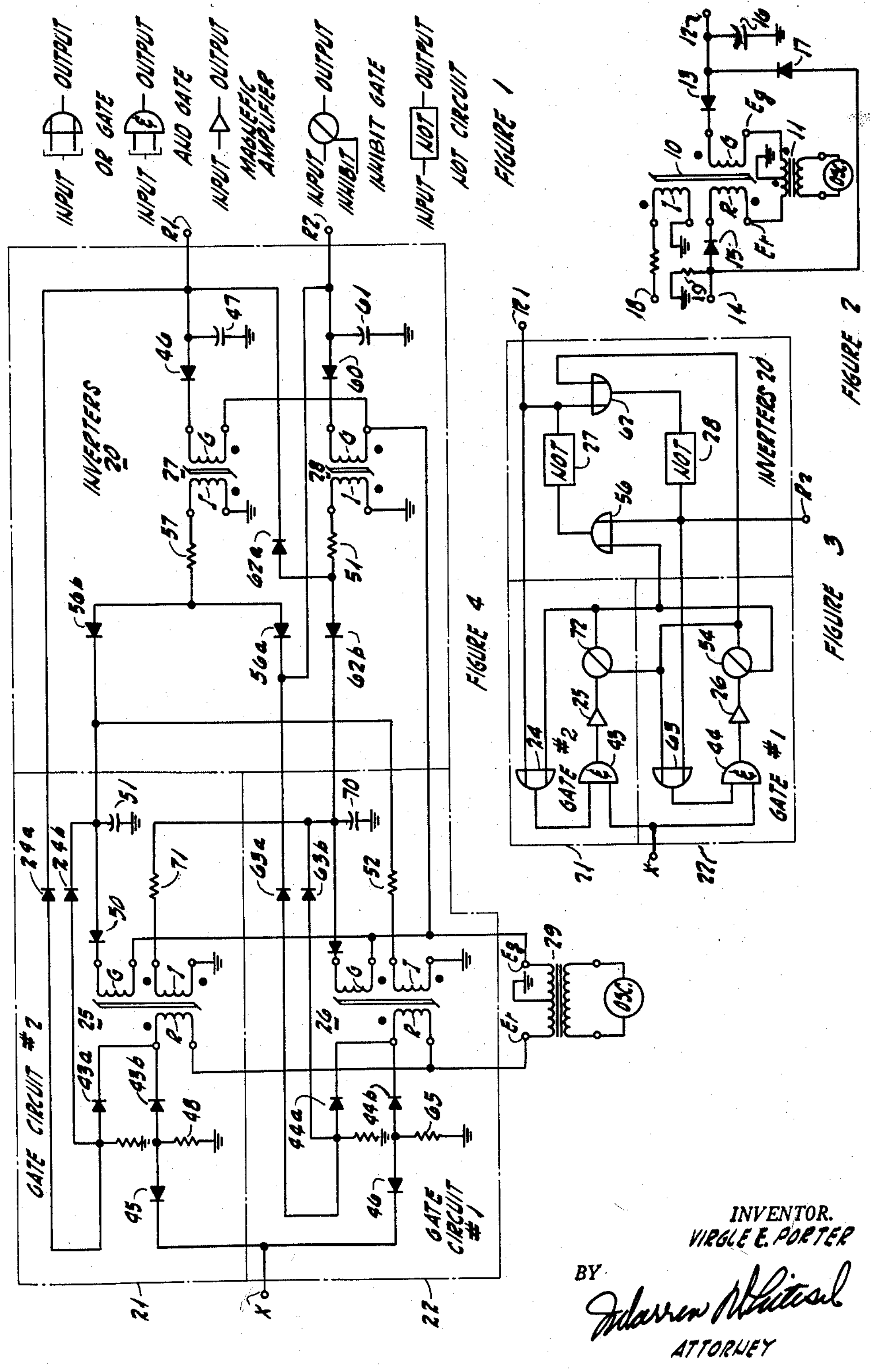
FIG. 1 is a series of logic symbols that are used in FIG. 3.
FIG. 2 shows by schematic circuit diagram a saturable reactor of the type used in the schematic diagram of FIG. 4.
FIG. 3 is a logic circuit diagram which illustrates the manner in which the circuit operates.
FIG. 4 is a schematic circuit diagram showing a magnetic flip-flop circuit constructed in accordance with this invention.

Before turning to a description of the circuit per se, reference is made to FIG. 1 which shows the individual logic symbols used in FIG. 3. An "or" gate is shown as a semicircle having a plurality of input conductors which bisect the cord thereof. An output signal appears on the output conductor if any input conductor is marked. An "and" gate is shown as a semicircle having an ampersand enclosed therein. If all input conductors of an "and" gate are energized, a signal appears on the output conductor. A magnetic amplifier is shown as a small equilateral triangle; any signals appearing on the input conductor are amplified and applied to the output conductor. An inhibit gate is shown as a circle having a slanting diagonal line. If the inhibit conductor is energized, no signal appears on the output conductor, but if the inhibit conductor is not energized, any signals appearing on the input conductor are applied to the output conductor. Finally, FIG. 1 shows a "not" circuit as a rectangle including the word "not." With this circuit, the output conductor is energized any time that the input conductor is not energized.

The circuit functions depend upon the magnetic characteristics of saturable reactors. While the properties and operations of such reactors are generally known, a brief description is given here to assist the reader in understanding the construction and operation of the circuit of FIG. 4. More particularly, as shown in FIG. 2, the saturable reactor includes an annular core 10 made of square hysteresis loop material such as that sold under the trademark "Deltamax." It should be understood, however, that some squareness may be sacrificed to obtain a low coercive force and correspondingly a low magnetizing NI (ampere turns).

As shown in FIG. 2, the annular core 10 has three windings thereon, i.e. a gate winding "G," a reset winding "R," and an inhibit winding "I." The polarity of the windings is indicated by a heavily inked dot adjacent to one end thereof, i.e. when current flows into the end having the heavily inked dot, the core is driven toward positive magnetic saturation.

Means are provided for energizing the gate and reset windings "G," "R," alternately. More specifically, a suitable source of reversing biasing potential (here shown as an A.C. generator "OSC") is connected across the primary of a transformer 11 having a secondary winding which is grounded at the mid-point thereof. Thus, during first half-cycles in the output of oscillator "OSC" a resetting voltage appearing at point $E_r$ has a negative potential and during alternate half-cycles a gating voltage appearing at point $E_g$ has a negative potential. The gate winding "G" is connected between the right-hand or $E_g$ terminal of the secondary winding of transformer 11 and an output terminal 12 through a diode 13. Thus, the gate winding "G" is energized during each half-cycle, when negative current flows from point E*g* through diode 13 to output terminal 12. The reset winding "R" is connected between the other end of the secondary winding of transformer 11 and an input terminal 14 via a diode 15. The diode 15 is poled so that current flows from point E*r* through reset winding "R" and diode 15 through resistor 19 to ground each time that point E*r* is at a negative polarity. The number of turns in the gate winding "G" is selected so that the core 10 is driven to positive saturation responsive to an integration of successive half-cycles when point E*g* has a negative potential, if the reset winding "R" is not energized between those half-cycles. On the other hand, the number of turns in reset winding "R" is adequate to drive the core to negative saturation during each half-cycles when point E*r* is negative.

In its quiescent state, core 10 is driven from negative magnetic saturation toward but not to positive magnetic saturation during first half-cycles in the output of oscillator "OSC," and to negative saturation during second half-cycles. If the core 10 does not saturate, the impedance of the gate winding "G" remains relatively high, and substantially none of the current applied from oscillator "OSC" through gate winding "G" reaches output terminal 12.

When a sufficiently high negative potential is applied to the input terminal 14, diode 15 is back biased, and no current flows through the reset winding "R" during the second half-cycles. Since the reset winding "R" is not energized, core 10 is driven to positive saturation during successive first half-cycles. Thereafter, substantially none of the energy applied from the oscillator "OSC" through the gate winding "G" is utilized to magnetize the core and the impedance of the gate winding "G" drops. Substantially all of the voltage appearing at E*g* now reaches the output terminal 12. Since the output current flows through the gate winding "G" only during half-cycles when point E*g* is negative, the output voltage is pulsating D.C. A filter means, here shown as a relatively large capacitor 16, is connected to the output terminal 12 to provide a substantially smooth D.C. current flow, a portion of which feeds back through diode 17 to maintain the back bias on diode 15 and prevent the energization of reset winding "R" to form a flip-flop circuit.

The third or inhibit winding "I" is wound on the core 10 in a direction which resets or drives the core to negative saturation when terminal 18 is energized. Hence, a signal applied to terminal 14 turns the saturable reactor "on," feedback via diode 17 holds it "on," and a signal applied to terminal 18 turns it "off." For more information about saturable reactors of this type, reference is made to a co-pending application entitiled "Logic Circuits," S.N. 813,141, filed May 14, 1959, by Arthur J. Radcliffe, Jr., and assigned to the assignee of this invention.

FIG. 3 shows the invention by a logic circuit diagram and FIG. 4 shows the same circuit by a schematic circuit diagram. To assist the reader in correlating these two circuit diagrams, similar reference numerals have been used to identify similar parts. For example, the components of the "or" gate 24 in FIG. 3 are shown as a pair of diodes 24*a*, 24*b* in FIG. 4. Therefore, in the description which follows, the reader may refer to FIGS. 3 and 4 interchangeably.

The flip-flop logic function results from the alternative energization of terminals R1, R2. Thus, in one stable state, a "not" circuit in inverter circuits 20 is "flipped" to energize terminal R1 and in the other stable state, a "not" circuit in inverter circuits 20 is "flopped" to energize terminal R2. More particularly, the magnetic logic circuit includes inverter circuits 20 and a pair of gate circuits 21, 22. The inverters include a pair of output terminals R1, R2, one or the other of which is always energized. Responsive thereto, a signal is fed back to prevent energization of the other output terminal until the occurrence of a subsequent trigger signal. The two gate circuits 21, 22 automatically steer trigger pulses received at an input terminal to cause the inverter 20 to energize the correct output terminal and feed back a signal to prepare the gate circuits so that the next trigger pulse switches the inverter circuits to the other state.

The major component of each gate circuit is a saturable reactor (25, 26, respectively) and the major components of the inverter circuits are a pair of saturable reactors 27, 28. Each reactor is constructed as described above in connection with FIG. 2, except that the inverter reactors 27, 28 have no reset winding. The power for all reactors is supplied from a common oscillator "OSC" and coupling transformer 29 which is normally common to many of these and similar circuits in a system. Thus, the cores of the gate reactors 25, 26 are driven alternately toward (but not to) and away from magnetic saturation responsive to successive half-cycles in the output of the oscillator. Since the inverter reactors 27, 28 have no reset windings, each core is saturated responsive to successive half-cycles if the associated inhibit windings "I" are not then energized.

All of the remaining components are diodes, resistors, or capacitors which interconnect the various terminals to provide the gating functions indicated by the logic diagram of FIG. 3. Since these components function well in hostile environments and, further, since no tubes, inexpensive transistors or other components subject to failure under adverse operating conditions are present, the circuit provides an extremely reliable unit. High temperature silicon transistors are available but their cost is currently prohibitive. Not so with silicon diodes. Moreover, the degrading effects of radiation (alpha, beta, gamma) have a less pronounced effect on magnetic amplifier diode logic circuits than they would have if the expensive silicon transistors were used.

In carrying out this invention each of the gate circuits 21, 22 includes a two-input "and" gate 43, 44. One input of each "and" gate (diodes 43*b*, 44*b*) is connected to the common input terminal X via isolating diodes 45, 46. The other input of "and" gate 43 (diode 43*a*) is connected to the inverter 20 output terminal R1 and the other input of "and" gate 44 (diode 44*a*) is connected to the inverter output terminal R2. When terminal X is made negative by a trigger pulse, one or the other of the "and" circuits 43, 44 conducts depending upon which of the output terminals R1, R2 is then energized. Responsive to current emanating from the conductive "and" gate, the inverter is triggered, and the output signal is switched from the conductive output terminal R1 or R2 to the non-conductive output terminals.

It is thought that the invention will be understood best by the following step-by-step description of circuit operations occurring responsive to the receipt of each trigger pulse.

Let it be assumed, for the purposes of this description, that the core of reactor 27 is saturated and that the core of reactor 28 is unsaturated. The gate winding "G" of reactor 27 has, therefore, a relatively low impedance and substantially all of the voltage appearing at point E*g*, when it is negative, passes through diode 46 to terminal R1. The filter capacitor 47 charges and discharges to provide a relatively smooth D.C. voltage. Since the core of reactor 28 is not saturated, the associated gate winding "G" has a relatively high impedance and very little of the voltage during half-cycles when point E*g* is negative reaches the output terminal R2.

As current flows through the saturated gate winding "G" of reactor 27, a signal is fed back to the gate circuit 21 over a path traced from the capacitor 47 through an "or" gate diode 24*a*, to an "and" gate diode 43*a*. Since the other input diode 43*b* is not back biased at this time, there is no effect, i.e. reset current may flow from point E*r* over an alternate path through winding "R" on reactor 25, through diode 43*b* and resistor 48 to ground.

A current also flows from output terminal R1 through an "or" gate diode 62a, a current limiting resistor 51, and the turns of the inhibit winding "I" on reactor 28 to ground. Responsive to the energization of this inhibit winding, the core of reactor 28 is held as negative magnetic saturation.

Next, let it be assumed that a negative trigger pulse of indeterminate width appears at the input terminal "X" and is applied through an isolating diode 45 to back bias diode 43b in the "and" gate 43. When the oscillator "OSC" next makes the point Er negative, current cannot flow through reset winding "R" of reactor 25 because of both of the diodes 43a, 43b are back biased. Thus, the successive energizations of the gate winding "G" during half-cycles when point Eg is negative drive the core of reactor 25 into magnetic saturation. Thereupon, the impedance of gate winding "G" drops sharply and during each ensuing half-cycle of current is passed by diode 50, filter capacitor 51 is charged to produce a relatively smooth D.C. potential.

Means are provided for locking out one of the input circuits responsive to energization of an output terminal. Thus, as shown in FIG. 3, for example, energization of output terminal R1 causes current flow through "or" gate 24, "and" gate 43, amplifier 25, the input and output of inhibit gate 72 and the inhibit terminal of inhibit gate 54, which locks-out gate circuit 22. In FIG. 4, the D.C. potential built on capacitor 51 is applied through a resistor 52 and the turns of inhibit winding "I" on reactor 26, thus performing the logic function of inhibit gate 54 (FIG. 3). This same D.C. potential built on capacitor 51 is applied through an "or" gate diode 56b and a current limiting resistor 57 to energize the inhibit winding "I" on reactor 27. Responsive thereto, the core of the reactor 27 is reset, the impedance of its gate winding "G" goes up, and virtually no current flows through diode 46 to output terminal R1. After reactor 27 resets current no longer flows through the "or" gate diode 24a; however, there is no immediate effect because current flowing through gate winding "G" (saturable reactor 25), and diode 24b takes over the function of the current flowing through diode 24a to back bias "and" gate diode 43a.

When reactor 27 resets, the charge on capacitor 47 decays, current ceases flowing through "or" gate diode 62a, resistor 51, and inhibit winding "I" of reactor 28. When the inhibit winding is de-energized the core of reactor 28 automatically saturates responsive to successive half-cycles when the potential at point Eg is negative, the circuit for saturating current being traced from point Eg through gate winding "G" of reactor 28, diode 60, and filter capacitor 61 to ground and to the output circuit loads. Output terminal R2 is now energized. This same current flows through "or" gate diode 56a and current limiting resistor 57 to energize the inhibit winding "I" of reactor 27, thus holding the core of reactor 27 in its reset condition. The current flowing through gate winding "G" of reactor 28, diode 60 and "or" gate diode 63a places a negative potential on the anode of "and" gate diode 44a, which is back biased.

Nothing further happens until the next negative trigger pulse of indeterminate width is applied to the input terminal "X" because reset current can still flow from point Er through winding "R" (reactor 26), diode 44b, and a current limiting resistor 65 to ground. When the next pulse appears at the input terminal "X," a negative voltage is applied through isolating diode 46 to the anode of "and" gate diode 44b, which is back biased. Since the other "and" gate diode 44a is already back biased by the feedback current extended from output terminal R2 through diode 63a, reset current cannot flow in winding "R" of reactor 26. Hence, the core of reactor 26 is driven to saturation by successive energizations of gate winding "G" during half-cycles when point Eg is negative.

The gate circuit 21 is locked out when current flows through gate winding "G" after saturation of the core of reactor 26. Filter capacitor 70 provides a relatively smooth D.C. output potential. Current flows through "or" gate diode 62b, current limiting resistor 51, and inhibit winding "I" to reset the core of reactor 28, while current flows through "or" gate diode 63b to keep the back biasing potential on "and" gate diode 44a. Current also flows through a limiting resistor 71 and inhibit winding "I" on reactor 25 to ground. This energization of the inhibit winding "I" is the logic function indicated by the gate 72 in FIG. 3.

Among the many advantages of the subject circuit are the compatible output and input requirements and the use of D.C. steering. The compatible input and output circuits permit the cascading or paralleling of many similar circuits without complicated inter-stage buffer circuits. The D.C. steering allows use in connection with a great number of logic circuits which were not able to perform these functions heretofore.

While the principles of the invention have been described in connection with specific apparatus, it is to be clearly understood that this description is made only by way of example and not as limitation on the scope of the invention.

I claim:

1. In a magnetic logic circuit, the combination comprising a first input circuit, a second input circuit, each of said input circuits including an "and" gate, each of said "and" gates having a first input and a second input, means for connecting the first input of each of said "and" gates to a common input terminal, an output circuit comprising a magnetic inverter having a first output terminal and a second output terminal, means for connecting said first output terminal to the second input of said "and" gate in said first input circuit, means for connecting the second of said output terminals to the second terminal of said "and" gate of said second input circuit, means responsive to energization of said "and" gate in said first input circuit for energizing said second output terminal and means responsive to energization of said "and" gate in said second input circuit for energizing said first output terminal.

2. The magnetic logic circuit of claim 1 wherein each of said input circuits includes a saturable reactor having a core with at least gate and reset windings thereon and means for energizing said windings alternately, the number of turns in said windings being such that said cores saturate responsive to the integration of two or more of said alternate energizations of said gate windings; and wherein each of said "and" gates comprises alternative paths for energizing the reset winding of the reactor in the input circuit associated with that "and" gate, and means responsive to energization of each input terminal of an "and" gate for blocking current flow over an associated path to a reset winding, whereby said core saturates responsive to successive energizations of a gate winding.

3. The magnetic logic circuit of claim 2 and filter means coupled to each of said gate windings, and means for feeding back a signal from said filter means to a reset winding to hold a core associated with said reset winding in a saturated condition.

4. In a magnetic logic circuit, the combination comprising a pair of gate circuits each including a saturable reactor having at least a reset winding thereon, a two-input "and" gate coupled to each of said reset windings, each input of said "and" gates being associated with a separate path for energizing the reset winding coupled thereto, one input of each of said "and" gates being connected to a common input terminal, means including said common connection for blocking current flow over a first path to each coupled reset winding when said input terminal is energized, an output circuit comprising a magnetic inverter having a pair of output terminals which are alternatively energized, means for connecting one of said output terminals to the other input terminal of one of said "and" gates to block current flow over one path to the coupled reset winding when said one output terminal is energized, means for connecting the other of said output terminals to the other input terminal of the other of said "and" gates to block current flow over another path to the coupled reset winding when said other output terminal is energized, means responsive to simultaneous energization of both inputs on said one "and" gate for energizing said other output terminal, and means responsive to simultaneous energization of both inputs on said other "and" gate for energizing said one output terminal.

5. In a magnetic logic circuit, the combination comprising a pair of input circuits each including a saturable reactor having a core with gate, reset and inhibit windings thereon, means for successively energizing said gate and reset windings alternately, the number of turns in said gate and reset windings being such that said cores do not saturate responsive to said alternate energizations, a two-input "and" gate coupled to each of said reset windings, one input of each of said "and" gates being connected to a common input terminal, an output circuit comprising a magnetic inverter having a pair of output terminals, means for connecting one of said output terminals to the other input terminal of one of said "and" gates, means for connecting the other of said output terminals to the other input terminal of the other of said "and" gates, means responsive to energization of said one "and" gates for blocking current flow through one of said reset windings, means responsive to energization of said other "and" gates for blocking current flow through the other of said reset windings, whereby a core saturates responsive to successive energizations of its gate winding when current flow through its reset winding is blocked, said gate winding on one of said reactors being connected to the inhibit winding on the other of said reactors and said gate winding on said other reactor being connected to the inhibit winding on said one reactor, means responsive to energization of said one "and" gate for energizing said other output terminal, and means responsive to energization of said other "and" gate for energizing said one output terminal.

6. In a magnetic logic circuit, the combination comprising a pair of input circuits each including a two-input "and" gate, one input of each of said "and" gates being connected to a common input terminal, an output circuit comprising a magnetic circuit including a pair of saturable reactors each having a core with gate and an inhibit winding thereon, means for energizing said gate windings cyclically whereby said cores saturate responsive to successive energizations of said gate windings if the inhibit winding associated therewith is not then energized, a pair of output terminals, each of said output terminals being connected to an individually associated one of said magnetic circuit gate windings, means for connecting one of said output terminals to the other input terminal of one of said "and" gates, means for connecting the other of said output terminals to the other input terminal on the other of said "and" gates, means responsive to energization of said one "and" gate for energizing said inhibit winding of the reactor associated with said one output terminal, and means responsive to energization of said other "and" gate for energizing said inhibit winding of the reactor associated with said other output terminal.

7. A magnetic flip-flop circuit including a plurality of saturable reactors, each reactor including a core having a substantially rectangular hysteresis loop, a source of spaced pulses alternately having opposite polarity, means responsive to each pulse of one polarity for driving each of said cores toward but not to saturation, means responsive to each pulse of opposite polarity for driving some of said cores away from saturation, means responsive to the receipt of an input signal for selectively blocking said pulses of opposite polarity at one of said some cores, whereby said one core saturates responsive to successive pulses of said one polarity, a plurality of output terminals each individually associated with other of said cores, means responsive to saturation of said one core for causing one of said other cores to saturate, means responsive to said last named means for selectively energizing a first of said output terminals, means responsive to said energization of said first output terminal for steering the next input signal to block said pulses of opposite polarity at another of said some cores, whereby said last named core saturates responsive to successive pulses of said one polarity, means responsive to the saturation of said last named core for causing another of said other cores to saturate, and means responsive to said last named means for selectively energizing the other of said output terminals.

8. A magnetic flip-flop circuit including a plurality of saturable reactors, each reactor including a core having a substantially rectangular hysteresis loop, a source of spaced pulses alternately having opposite polarity, means responsive to each pulse of one polarity for driving each of said cores toward but not to saturation, means responsive to each pulse of opposite polarity for driving said cores away from saturation, means responsive to the receipt of an input signal for selectively blocking said pulses of opposite polarity at one of said cores, whereby said one core saturates responsive to successive pulses of said one polarity, a pair of output terminals, means for selectively energizing a first of said output terminals responsive to saturation of said one core, means responsive to said energization of said first output terminal for steering the next input signal to block said pulses of opposite polarity at another of said cores, whereby said other core saturates responsive to successive pulses of said one polarity, and means for selectively energizing the other of said output terminals responsive to saturation of said other core.

9. In a magnetic logic circuit, the combination comprising a pair of input circuits each including a substantially rectangular hysteresis loop core having gate, reset, and inhibit windings thereon, oscillator means for energizing each of said gate windings on each half-cycle and each of said reset windings on alternate half-cycles, said last named means alternately driving said cores toward, but not to, and away from magnetic saturation, an output circuit including a pair of substantially rectangular hysteresis loop cores each having a gate and an inhibit winding thereon, means responsive to the saturation of a core in one of said input circuits for energizing the inhibit winding associated with one of the cores in said output circuit, means responsive to the saturation of a core in the other of said input circuits for energizing the inhibit winding associated with the other of said cores in said output circuit, filter means connected to each of said gate windings, first feedback means coupled from the gate winding and filter means of said one core in said output circuit to said reset winding in said one input circuit, second feedback means coupled from the gate winding and filter means of said other core in said output circuit to said reset winding in the other of said input circuits, and means jointly responsive to energization of either of said feedback means and to the receipt of an input pulse for switching "on" the input circuit which is then marked by said feedback signal.

10. In a magnetic logic circuit, a plurality of input circuits having a common input terminal, an output circuit having a plurality of output terminals, means responsive to the receipt of an input pulse of indeterminate width for triggering one of said input circuits, means responsive to the triggering of said one input circuit for energizing one of said output terminals, means also responsive to said triggering of said one input circuit for locking out the other input circuit, means responsive to the receipt of a second input pulse of indeterminate width for triggering the other of said input circuits, means responsive to the triggering of said other input circuit for energizing the other of said output terminals and deenergizing said one output terminal, and means also responsive to said triggering of said other input circuit for locking out said one input circuit.

11. A magnetic logic circuit comprising a steering circuit including a pair of saturable reactors each having a square hysteresis loop core with at least a reset winding thereon, a pair of electrical circuits for energizing each of said reset winding, an inverter circuit having a pair of alternatively energized output terminals, means responsive to energization of one of said terminals for blocking current flow over one of said electrical circuits associated with the reset winding of a first of said reactors, means responsive to energization of the other of said terminals for blocking current flow over one of said electrical circuits associated with the reset winding of the other of said reactors, means responsive to the receipt of a trigger pulse for blocking current flow over the other of said electrical circuits associated with the reset windings of both of said reactors, means for thereafter saturating the core of the reactor having both electrical circuits blocked, and means responsive to said saturation of said core for switching the energization of said terminals.

12. A magnetic logic circuit comprising a pair of saturable reactors each having a square hysteresis loop core, with at least an inhibit winding thereon, a steering circuit having a pair of alternatively energized output circuits, means responsive to energization of one of said output circuits for energizing one of said inhibit windings, means responsive to energization of the other of said output circuits for energizing the other of said inhibit windings, means responsive to the receipt of a trigger pulse for switching the energizing current flow from one of said output circuits to the other of said output circuits, means for thereafter saturating the core of the reactor having the inhibit winding which is not then energized, and means responsive to said saturation of said core for switching the energizing current flow between a pair of output terminals.

References Cited in the file of this patent

UNITED STATES PATENTS

| | | |
|---|---|---|
| 2,682,615 | Sziklai et al. | June 29, 1954 |
| 2,852,699 | Ruhman | Sept. 16, 1958 |

OTHER REFERENCES

Richards: "Arithmetic Operations in Digital Computors," 1955, pp. 47 and 49 (2 sheets). (Copy in Patent Office Library.)